(12) United States Patent
Takeyama

(10) Patent No.: US 9,559,378 B2
(45) Date of Patent: Jan. 31, 2017

(54) FUEL CELL STACK CASE WITH PRESSURE PLATE

(75) Inventor: Makoto Takeyama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 177 days.

(21) Appl. No.: 14/128,775

(22) PCT Filed: Jun. 25, 2012

(86) PCT No.: PCT/IB2012/001249
§ 371 (c)(1),
(2), (4) Date: Dec. 23, 2013

(87) PCT Pub. No.: WO2013/001338
PCT Pub. Date: Jan. 3, 2013

(65) Prior Publication Data
US 2014/0147769 A1    May 29, 2014

(30) Foreign Application Priority Data
Jun. 28, 2011  (JP) .................................. 2011-142945

(51) Int. Cl.
*H01M 2/20* (2006.01)
*H01M 8/24* (2016.01)
*H01M 8/10* (2016.01)

(52) U.S. Cl.
CPC ........... *H01M 8/248* (2013.01); *H01M 8/2475* (2013.01); *H01M 2008/1095* (2013.01); *Y02E 60/50* (2013.01); *Y02E 60/521* (2013.01); *Y02P 70/56* (2015.11)

(58) Field of Classification Search
CPC ................ H01M 8/248; H01M 8/2475; H01M 2008/1095; Y02P 70/56; Y02P 60/50
USPC .................................................. 429/469, 535
See application file for complete search history.

(56) References Cited

U.S. PATENT DOCUMENTS

| | | | |
|---|---|---|---|
| 6,720,101 B1* | 4/2004 | Dong .................. | H01M 8/2475 429/435 |
| 2002/0034673 A1* | 3/2002 | Bisaka .................. | H01M 8/248 429/454 |
| 2010/0098984 A1 | 4/2010 | Lin et al. | |
| 2012/0264032 A1 | 10/2012 | Watanabe et al. | |

FOREIGN PATENT DOCUMENTS

| | | | |
|---|---|---|---|
| CA | 2654037 A1 | 12/2007 | |
| JP | 11-097054 A | 4/1999 | |
| JP | 2000-208163 A | 7/2000 | |
| JP | 2002063929 A | 2/2002 | |
| JP | 2002-302785 A | 10/2002 | |

(Continued)

*Primary Examiner* — Gary Harris
(74) *Attorney, Agent, or Firm* — Andrews Kurth Kenyon LLP

(57) ABSTRACT

A fuel cell that includes a cell stack in which a plurality of unit cells are stacked, a case that houses the cell stack, and a pressure plate that is placed in the case at a position between an end of the cell stack in the stacking direction and the case. The case has a first opening through which a pressing member that presses the pressure plate in the stacking direction from outside the case is brought into contact with the pressure plate, and a fixing portion that fixes the pressure plate in place with the cell stack compressed in the stacking direction.

8 Claims, 15 Drawing Sheets

(56) References Cited

FOREIGN PATENT DOCUMENTS

| JP | 2002-358985 A | 12/2002 |
|----|---------------|---------|
| JP | 2005-071869 A | 3/2005 |
| JP | 2005-524214 A | 8/2005 |
| WO | 03/094275 A1 | 11/2003 |
| WO | 2012/073271 A1 | 6/2012 |

* cited by examiner

FUEL CELL STACK CASE WITH PRESSURE PLATE

CROSS REFERENCE TO RELATED APPLICATION

This is a national phase application based on the PCT International Patent Application No. PCT/IB2012/001249 filed on Jun. 25, 2012, claiming priority to Japanese application No. 2011-142945 filed Jun. 28, 2011, the entire contents of both of which are incorporated herein by reference.

BACKGROUND OF THE INVENTION

1. Field of the Invention

The present invention relates to a fuel cell, and a method for the production of a fuel cell.

2. Description of Related Art

In general, a fuel cell is known in which a cell stack in which a plurality of cells are stacked is housed in a box-shaped case. In many cases, the cell stack is held in compression in the stacking direction in the case. In general, each cell includes a membrane electrode assembly in which a pair of electrodes is located on both sides of an electrolyte, and a pair of separators is located on both sides of the membrane electrode assembly.

As a method for adjusting the compressive load in the stacking direction that is applied to the cell stack that is housed in the case of a fuel cell, Japanese Patent Application Publication No. 2002-358985 (JP 2002-358985 A) discloses a method for adjusting the compressive load on the cell stack by rotating screws from outside the case to adjust the axial forces of the screws. Japanese Patent Application Publication No. 2005-524214 (JP 2005-524214 A) discloses a method for adjusting the compressive load by interposing shim plates (spacer plates) between the case and the cell stack.

However, in the case of the method for adjusting the compressive load by adjusting the axial forces of screws, the cell stack is compressed by stress from the screws and the stress may not be uniformly applied to the entire surface of the cell stack. In addition, chips may be formed when the screws are screwed in. On the other hand, in the case of the method for adjusting the compressive load by interposing shim plates, the weight of the fuel cell increases by the weight of the shim plates and it is difficult to adjust the compressive load finely by changing the thickness or number of the shim plates. As described above, the methods for adjusting the compressive load on a cell stack that is housed in a case in a fuel cell still have room for improvement.

SUMMARY OF THE INVENTION

The present invention provides a technique that facilitates the production of a fuel cell in which a cell stack is held in compression in the stacking direction in a case.

A fuel cell according to a first aspect of the present invention includes a cell stack in which a plurality of unit cells are stacked, a case that houses the cell stack, and a pressure plate that is placed in the case at a position between an end of the cell stack in the stacking direction and the case, and the case has a first opening through which a pressing member that presses the pressure plate in the stacking direction from outside the case is brought into contact with the pressure plate, and a fixing portion that fixes the pressure plate in place with the cell stack compressed in the stacking direction.

With this configuration, the pressure plate can be pressed in the stacking direction from outside the case through the first opening and the pressure plate can be fixed in place and held in compression in the stacking direction with the fixing portion. Thus, a fuel cell in which a cell stack is held in compression in the stacking direction in a case can be produced easily.

In the fuel cell according to the above aspect, the first opening may face the pressure plate in the stacking direction.

With this configuration, the pressure plate can be pressed in the stacking direction easily from outside the case because the first opening faces the pressure plate in the stacking direction.

In the fuel cell according to the above aspect, the fixing portion may include a female thread portion that is provided in the case to face the pressure plate in the stacking direction, and a screw member that has a proximal end which is connected to the female thread portion and a distal end which is in contact with the pressure plate.

With this configuration, the pressure plate can be easily restricted from moving against the stress from the cell stack in compression.

A fuel cell according to a second aspect of the present invention includes a cell stack in which a plurality of unit cells are stacked, a case that houses the cell stack, and a pressure plate that is placed in the case at a position between an end of the cell stack in the stacking direction and the case, and the case has at least first opening and second opening with different opening areas, which face the pressure plate in the stacking direction.

With this configuration, the pressure plate can be pressed in the stacking direction from outside the case through one type of opening and the pressure plate can be fixed in place and held in compression in the stacking direction through the other type of opening. Thus, a fuel cell in which a cell stack is held in compression in the stacking direction in a case can be produced easily.

In the fuel cell according to the above aspect, the number of the first opening, which has a larger opening area than the second opening, is one to three.

With this configuration, the pressure plate can be easily pressed with the pressing member in the stacking direction from outside the case through the first opening or openings.

In the fuel cell according to the above aspect, the number of the first opening may be two or three, and the first openings may be positioned such that the gravity center of the cell stack (the gravity center of the unit cells) is located between the two first openings or in a region that is surrounded by the three first openings as seen from the stacking direction.

With this configuration, the resultant force of the forces that are applied to the pressure plate by the pressing members can be applied at a point close to the gravity center of the cell stack (the gravity center of the unit cells) when the pressure plate is pressed in the stacking direction from outside the case through the first openings with two or three pressing members. Thus, the pressure plate can be pressed in the stacking direction easily.

In the fuel cell according to the above aspect, the number of the first opening may be one, and the first opening may be located at a position that is opposed to the gravity center of the cell stack (the gravity center of the unit cells) as seen in the stacking direction.

With this configuration, the pressure plate can be pressed at a point close to the gravity center of the cell stack (the gravity center of the unit cells) when the pressure plate is pressed in the stacking direction from outside the case through the first opening with a pressing member. Thus, the pressure plate can be pressed in the stacking direction easily.

In the fuel cell according to the above aspect, the first opening may be used to bring a pressing member that is used to press the pressure plate in the stacking direction from outside the case into contact with the pressure plate.

In the fuel cell according to the above aspect, the second opening which has a smaller opening area than the first opening, may have a thread groove in an inner periphery of the second opening.

With this configuration, the pressure plate can be fixed in position easily by attaching screw members to the female thread portions.

A method for the production of a fuel cell according to a third aspect of the present invention includes preparing a cell stack in which a plurality of unit cells are stacked and a case that is used to house the cell stack, placing the cell stack in the case such that an end of the cell stack in the stacking direction faces the case via a pressure plate, compress the cell stack in the case in the stacking direction by pressing the pressure plate with a pressing member from outside the case, and fixing the pressure plate in place with the cell stack compressed by the pressing member.

With this configuration, the pressure plate is fixed in place after the cell stack is compressed from outside the case. Thus, a fuel cell in which a cell stack is held in compression in the stacking direction in a case can be produced easily.

In the production method according to the above aspect, the case may have at least two types of openings through a side wall of the case, the cell stack may be placed in the case such that an end of the cell stack in the stacking direction faces the side wall via the pressure plate, the cell stack may be compressed by pressing the pressure plate using a pressing member in the stacking direction from outside the case through a first opening of the side wall, and the pressure plate may be fixed by attaching a screw member between the pressure plate and a second opening of the side wall.

With this configuration, the pressure plate is fixed in place by attaching the screw member between the pressure plate and the second opening while the cell stack is compressed from outside the case through the first opening. Thus, a fuel cell in which a cell stack is held in compression in the stacking direction in a case can be produced easily.

In the production method according to the above aspect, the pressure plate may be fixed by attaching the screw member when the compressive load which is applied to the cell stack by pressing the pressing member reaches a predetermined value, and the pressing force of the pressing member may be released after the screw member is attached.

With this configuration, the screw member can be attached easily because the pressing force of the pressing member is released after the screw member is attached to fix the pressure plate.

In the production method according to the above aspect, an external device that detects the pressing force of the pressing member may be used to detect the compressive load which is applied to the cell stack when the pressure plate is fixed.

With this configuration, the fuel cell can be simplified in structure because the fuel cell does not have to be provided with a detection part that detects the compressive load on the fuel cell.

It should be noted that the present invention may be implemented in various ways. For example, the present invention may be implemented in the form of a fuel cell production apparatus, a vehicle that is equipped with a fuel cell, a method for attaching a screw member that is used to compress a cell stack, and a storage medium in which a control program that causes a system to perform these methods is stored.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
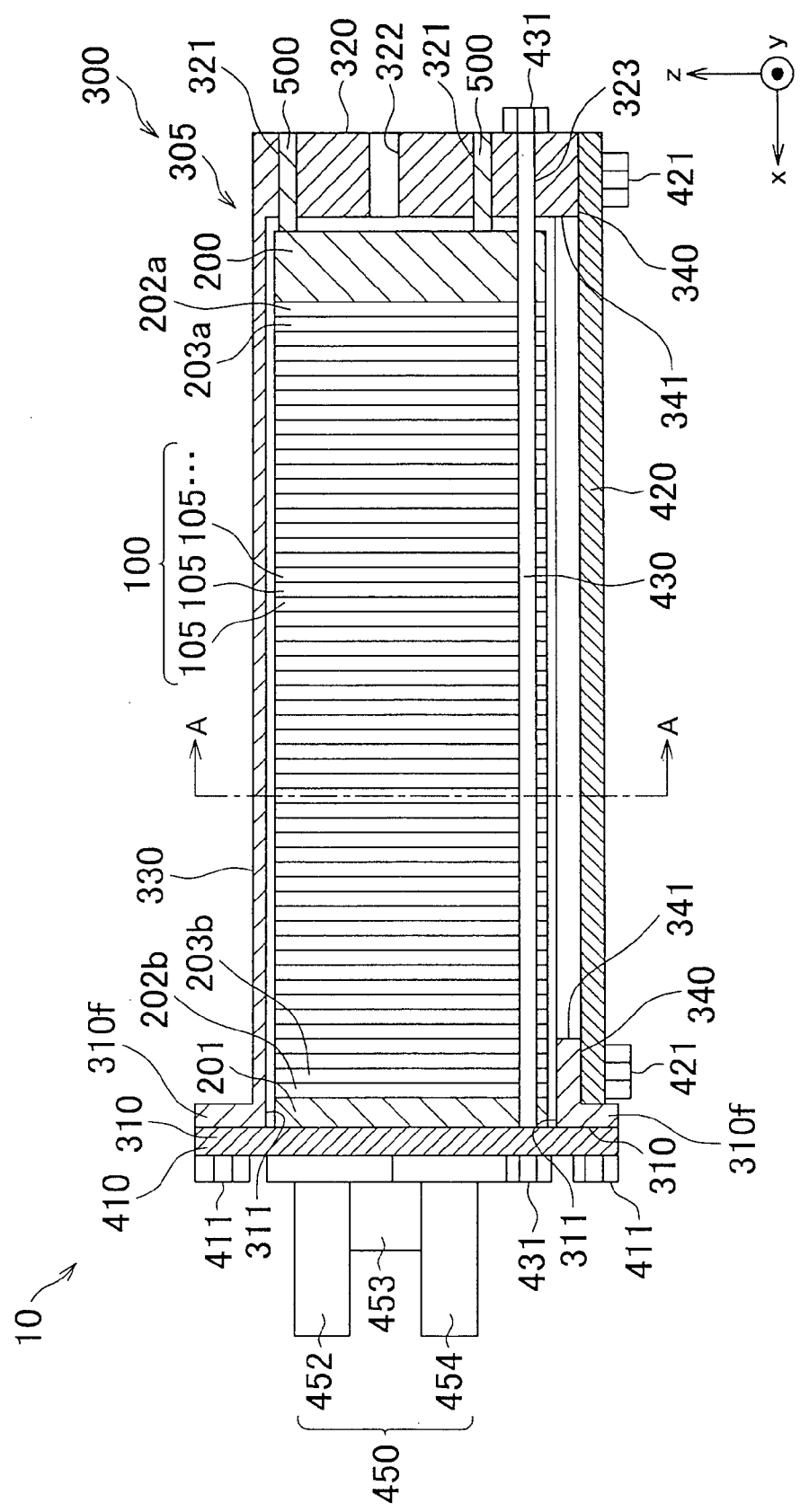
FIG. 1 is an explanatory diagram that is used to explain the general configuration of a fuel cell of a first embodiment of the present invention.

FIG. 1 is an explanatory diagram that is used to explain the general configuration of a fuel cell of a first embodiment. FIG. 1 illustrates a cross-sectional configuration of a fuel cell 10. The fuel cell 10 is a solid polymer fuel cell, which is supplied with hydrogen and oxygen to generate electric power. The fuel cell 10 is mounted on a movable body, such as a vehicle, and used as a power source of the movable body. The fuel cell 10 may be used as a stationary power supply. The fuel cell 10 includes a cell stack 100, a pair of terminal plates 203a and 203b, a pair of insulator plates 202a and 202b, a stack manifold 201, a pressure plate 200, a case 300, and a plurality of load-adjusting screws 500.

A plurality of unit cells 105 is stacked in the cell stack 100. The shape and configuration of the unit cell 105 are described later in connection with FIG. 3. In the following description, the direction along the stacking direction of the cell stack 100 is referred to as "x-direction," the direction perpendicular to the x-direction and along the longitudinal direction of the unit cells 105 is referred to as "y-direction," and the direction perpendicular to the x-direction and the y-direction is referred to as "z-direction." The terminal plates 203a and 203b as electrode plates are located on both sides of the cell stack 100, and the insulator plates 202a and 202b are located on both sides of the terminal plates 203a and 203b. The stack manifold 201 is located outside the insulator plate 202b to form flow paths for reactant gases (fuel gas, oxidant gas, etc.) and a cooling medium between the outside of the case 300 and the cell stack 100. The pressure plate 200, which is used to press the cell stack 100, is located between the insulator plate 202a and the case 300.

The case 300 includes a case body 305, a plate member 410, a cover member 420, and shaft members 430, which are all made of a metal, such as steel. In the case 300, the cell stack 100 is held in compression in the stacking direction (x-direction).

Figure 2A:
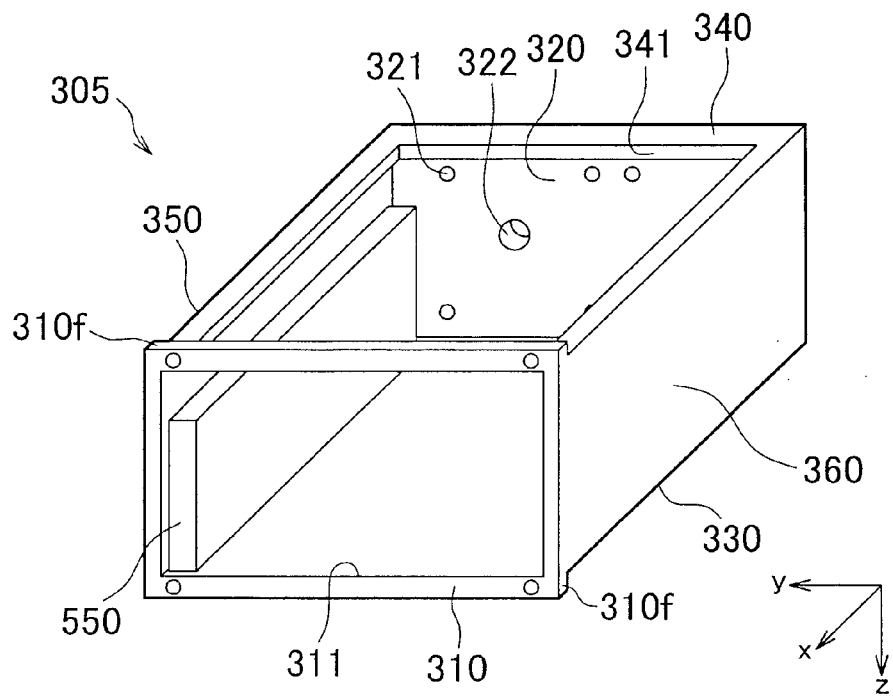
FIG. 2A and FIG. 2B are explanatory diagrams that are used to explain the general configuration of a case body according to the first embodiment.
Figure 2B:
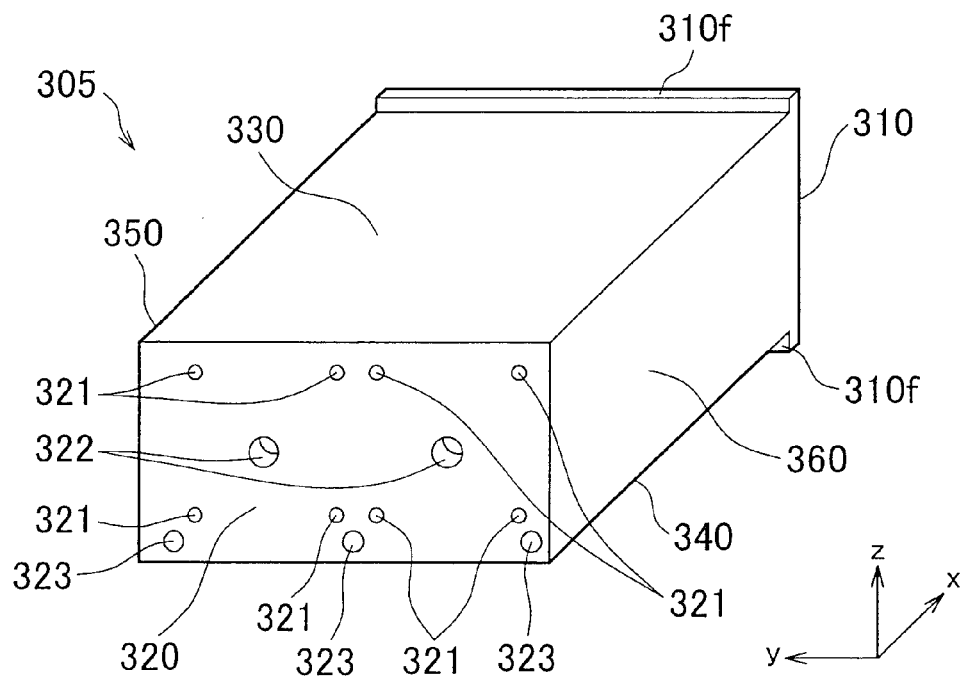

FIG. 2A and FIG. 2B are explanatory diagrams that are used to explain the general configuration of the case body. FIG. 2A is a perspective view of the case body 305 that is shown in FIG. 1. The case body is inverted in the vertical direction (z-direction) in FIG. 2A. FIG. 2B is a perspective view that illustrates the rear side (right side in FIG. 1) of the case body 305. The case body 305 has a generally rectangular box-shape outer configuration, and includes a front wall 310, a rear wall 320, a top wall 330, a bottom wall 340, a right side wall 350, and a left side wall 360. The interior surfaces of the case body 305 are coated with an insulating material (not shown) (such as a resin).

The front wall 310 is generally perpendicular to the top wall 330, the bottom wall 340, the right side wall 350, and the left side wall 360. The front wall 310 includes edges 310f that extend in a flange-like manner toward the top wall 330 and the bottom wall 340, and has a front opening 311 at its center. The rear wall 320 is formed at a position opposed to the front wall 310, and is generally perpendicular to the top wall 330, the bottom wall 340, the right side wall 350, and the left side wall 360.

The rear wall 320 has screw openings 321, pressing openings 322, and shaft openings 323. The screw openings 321 are screw holes (through holes) through which load-adjusting screws 500 (FIG. 1) with a thread groove are inserted, and have a thread groove which is engageable with the thread groove of each load-adjusting screw 500 in the interior surface thereof. The pressing openings 322 are through holes through which pressing members 120, which are described later (refer to FIG. 10A to FIG. 10C), are inserted, and have a circular outer configuration with a larger opening area than the screw openings 321 in this embodiment. The shaft openings 323 are through holes through which the shaft members 430 (FIG. 1) are inserted. The positions and numbers of the screw openings 321, the pressing openings 322, and the shaft openings 323 are described in detail later in connection with FIG. 4.

The top wall 330 and the bottom wall 340 are formed at positions opposed to each other, and are generally perpendicular to the right side wall 350 and the left side wall 360. The bottom wall 340 has a bottom opening 341 which occupies almost entire central portion thereof. The right side wall 350 and the left side wall 360 are formed at positions opposed to each other, and connected at their peripheries to the peripheries of the front wall 310, the rear wall 320, the top wall 330 and the bottom wall 340. In this embodiment, the front wall 310 and the rear wall 320 are formed with their normal direction extending along the x-direction, and the top wall 330, the bottom wall 340, the right side wall 350 and the left side wall 360 are formed parallel to the x-direction. A monitoring circuit 550 that monitors the cell voltage of the cell stack 100 is located along the right side wall 350 in the case body 305.

As shown in FIG. 1, the plate member 410 with a generally rectangular shape is attached to the front wall 310 by bolts 411, and the front opening 311 is closed by the plate member 410. Auxiliary components 450 are attached to the plate member 410. Examples of the auxiliary components 450 include pipes 452 and 454 through which reactant gases from outside sources are supplied into the manifold and a pump 453 that is used to deliver a fuel gas (hydrogen). The cover member 420 with a generally rectangular shape is attached to the bottom wall 340 by bolts 421, and the bottom opening 341 is closed by the cover member 420.

The shaft members 430 are rod-like members that are made of a metal, for example, and extend in the x-direction through the case 300. Each shaft member 430 has one end that is fixed to the plate member 410 by a nut 431 and another end that extends through a corresponding shaft opening 323 and is fixed to the rear wall 320.

The load-adjusting screws 500 are rod-like members which are made of a metal, for example, and have a thread groove. Each load-adjusting screw 500 has a proximal end that is fixedly threaded into a corresponding screw opening 321 of the rear wall 320 and a distal end in contact with the pressure plate 200. The length from the rear wall 320 to the position where a load-adjusting screw 500 is in contact with the pressure plate 200 can be adjusted by rotating the load-adjusting screw 500.

The pressure plate 200 has the same flat plate-like outer configuration as the unit cells 105, and is located between the rear wall 320 of the case body 305 and the cell stack 100. The pressure plate 200 preferably has a sufficiently larger thickness than the terminal plates 203a and 203b and the insulator plates 202a and 202b and can transmit the pressing force from outside uniformly to the entire surface of the cell stack 100. The pressure plate 200 is pressed in the direction from the cell stack 100 toward the rear wall 320, but restricted from moving by the load-adjusting screws 500. The pressure plate 200, the stack manifold 201 and the plate member 410 may be used as constituent parts (such as end plates) of a fuel cell stack that includes the cell stack 100.

The cell stack 100 is subjected to a prescribed load between the pressure plate 200 and the plate member 410 in the case 300. In other words, the cell stack 100 of this embodiment is held in compression in the x-direction in the case 300.

Figure 3:
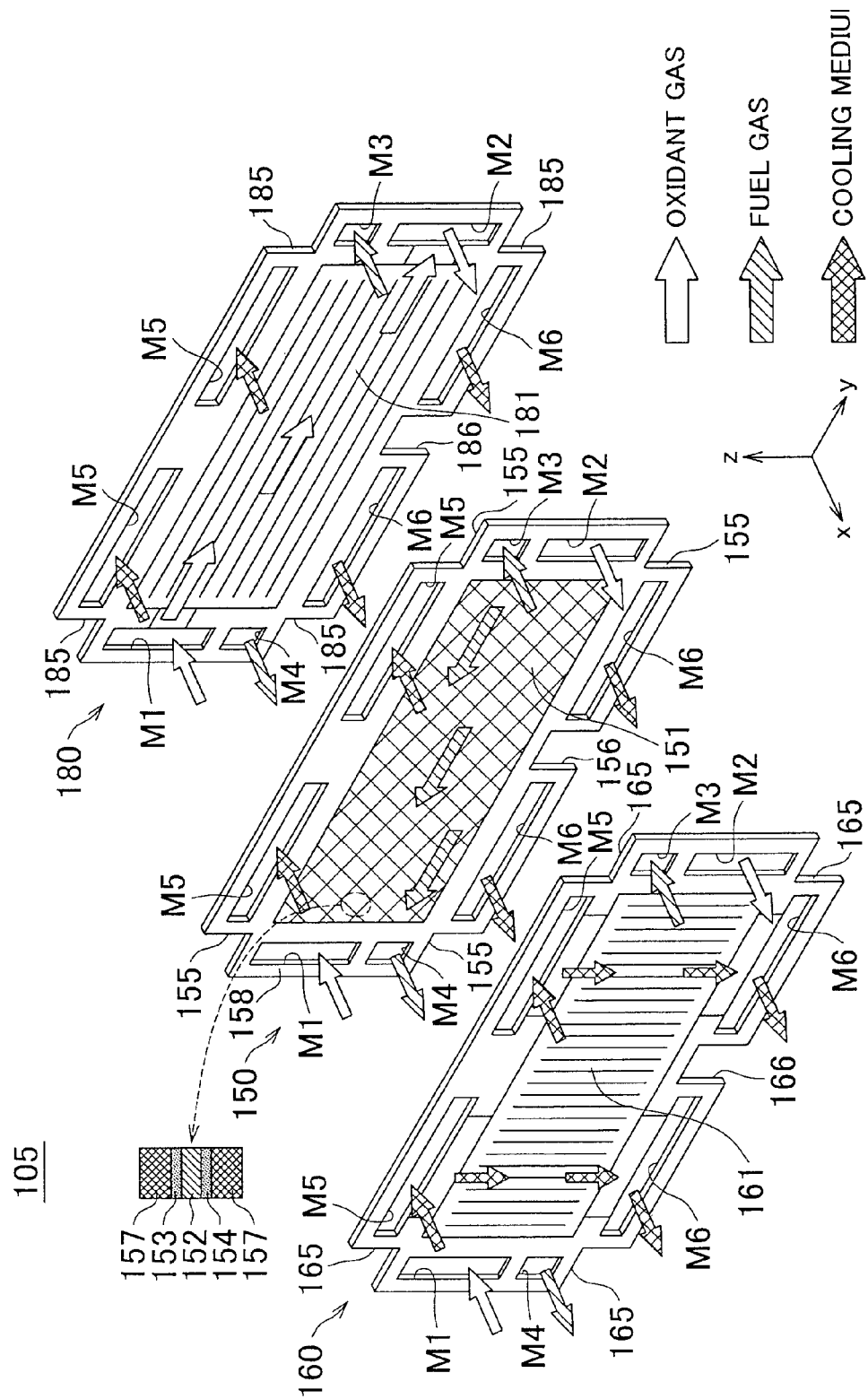
FIG. 3 is an explanatory diagram that is used to explain the general configuration of a unit cell according to the first embodiment.

FIG. 3 is an explanatory diagram that is used to explain the general configuration of a unit cell. A unit cell 105 includes a seal-integrated membrane electrode assembly 150, and a pair of separators 160 and 180 (which may be hereinafter referred to as "first separator 160" and "second separator 180," respectively) that are located to sandwich the seal-integrated membrane electrode assembly 150 from both sides. The seal-integrated membrane electrode assembly 150 includes a membrane electrode assembly 151 and a seal gasket 158 that is formed along the peripheries of the membrane electrode assembly 151. The membrane electrode assembly 151 includes a solid polymer electrolyte film 152, an anode 153 and a cathode 154 that are located on both sides of the solid polymer electrolyte film 152, and a pair of gas diffusion layers 157 that are located outside the anode 153 and the cathode 154.

The solid polymer electrolyte film 152 is formed of a fluorine-based resin material or hydrocarbon-based resin material, and has good proton conductivity when in a wet state. Each of the anode 153 and the cathode 154 includes carbon particles on which a catalyst metal (such as platinum) which promotes an electrochemical reaction is deposited (catalyst-deposited carrier) and a polymer electrolyte which has proton conductivity (such as a fluorine-based resin). The gas diffusion layers 157 are formed of a gas permeable conductive material such as carbon paper. The seal gasket 158 is formed by injection molding of a synthetic resin or the like along the peripheries of the membrane electrode assembly 151. The first separator 160 and the second separator 180 have a plate-like outer configuration, and are formed of a gas impermeable conductive material, such as a high-density carbon prepared by compressing carbon to provide it with gas impermeability, a calcined carbon, or a metal material, such as stainless steel.

The seal-integrated membrane electrode assembly 150 and the separators 160 and 180 have through holes in their peripheries so that manifolds M1 to M6, through which reactant gases (fuel gas and oxidizing gas) and a cooling medium (such as water) flow in the stacking direction (x-direction), can be formed when the unit cells 105 are stacked. Specifically, an oxidant gas (cathode feed gas) that is supplied from an external source flows through the manifold M1, and a gas that has passed through the membrane electrode assembly 151 and contains the oxidant gas (cathode off-gas) flows through the manifold M2. A fuel gas (anode feed gas) that is supplied from an external source flows through the manifold M3, and a gas that has passed through the membrane electrode assembly 151 and contains the fuel gas (anode off-gas) flows through the manifold M4. A cooling medium that is supplied from an external source flows through the manifolds M5, and the cooling medium which has been used for cooling flows through the manifolds M6.

One of the two principal surfaces of the first separator 160 which faces the membrane electrode assembly 151 has flow path grooves (not shown) into which the fuel gas (anode feed gas) flows from the manifold M3. The other principal surface of the first separator 160 has flow path grooves 161 into which the cooling medium flows from the manifolds M5. One of the two principal surfaces of the second separator 180 which faces the membrane electrode assembly 151 has flow path grooves 181 into which the oxidant gas (cathode feed gas) flows from the manifold M1. The other principal surface of the second separator 180 has flow path grooves (not shown) into which the cooling medium flows from the manifolds M5.

The seal-integrated membrane electrode assembly 150 and the separators 160 and 180 have a flat, rectangular, plate-like configuration with notches 155, 165 and 185, respectively, at their corners. Of the peripheries of the seal-integrated membrane electrode assembly 150 and the separators 160 and 180 that extend in their longitudinal direction (y-direction), the peripheries that face the bottom wall 340 when they are housed in the case 300 have notches 156, 166 and 186, respectively, near the center thereof.

Figure 4:
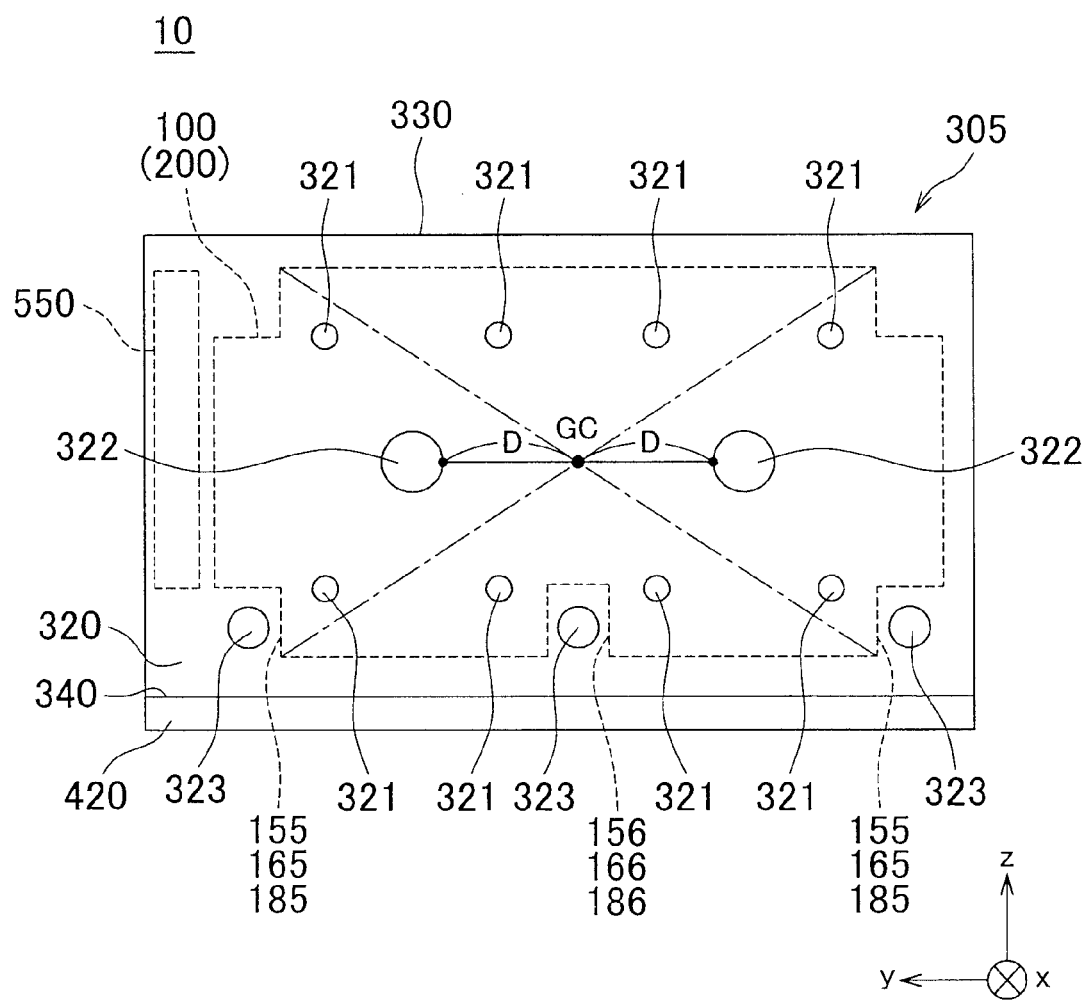
FIG. 4 is an explanatory diagram that is used to explain the positions of screw openings, pressing openings and shaft openings of the case body according to the first embodiment.

FIG. 4 is an explanatory diagram that is used to explain the positions of the screw openings 321, the pressing openings 322 and the shaft openings 323 of the case body. FIG. 4 illustrates the rear wall 320 of the fuel cell 10 as seen in the x-direction. In FIG. 4, the positions of the cell stack 100 and the monitoring circuit 550 are indicated by broken lines. Because the cell stack 100 and the pressure plate 200 have generally the same shape as seen in the x-direction, the broken lines in FIG. 4 also indicate the position of the pressure plate 200.

The rear wall 320 of the case body 305 has eight screw openings 321, two pressing openings 322, and three shaft openings 323. The eight screw openings 321 are formed at positions opposed to the peripheries of the cell stack 100 as seen in the x-direction. This prevents the peripheries of the cell stack 100 from being bent by a reaction force from the cell stack 100, which is held in compression in the stacking direction (x-direction), because the load-adjusting screws 500 press the peripheries of the cell stack 100 when the load-adjusting screws 500 are inserted into the screw openings 321. In addition, the screw openings 321 are located to surround the pressing openings 322. This enables the distances from the screw openings 321 to the surface of the pressure plate 200 to be generally equal even if portions of the surface of the pressure plate 200 around the positions, where the pressure plate 200 is pressed by the pressing members 120, are bent when the pressure plate 200 is pressed by the pressing members 120 through the pressing openings 322. As a result, the reaction force from the cell stack 100 in a compressed state is equally distributed to the load-adjusting screws 500 after the load-adjusting screws 500 are attached to the screw openings 321.

The two pressing openings 322 are located on both sides of the gravity center GC of the cell stack 100 as seen in the x-direction. In other words, the two pressing openings 322 are located such that the gravity center GC of the cell stack 100 is located between the two pressing openings 322 as seen in the x-direction. This enables the resultant force of the pressing forces that are applied to the pressure plate 200 to act at a point close to the gravity center GC of the cell stack 100 when the pressure plate 200 is pressed by the pressing members 120 through the pressing openings 322. This prevents the generation of a moment due to the difference between the point of application of the resultant force and the gravity center GC and enables the cell stack 100 to be compressed straight in the stacking direction (x-direction).

In this embodiment, the two pressing openings 322 are formed at the same distance D from the gravity center GC of the cell stack 100. This enables the resultant force of the pressing forces that are applied to the pressure plate 200 to act at a point closer to the gravity center GC of the cell stack 100. In this embodiment, the pressing openings 322 have a circular configuration which allows insertion of the circular columnar pressing members 120 therethrough. Thus, while the distance D is shown as the distance from the gravity center GC of the cell stack 100 to the edges of the pressing openings 322 closest to the gravity center GC of the cell stack 100, the distance D may be defined as the distance from the gravity center GC of the cell stack 100 to the centers of the pressing openings 322.

The two pressing openings 322 may be located at different distances from the gravity center GC of the cell stack 100 as long as they are located on both sides of the gravity center GC of the cell stack 100 as seen in the x-direction. This is because the cell stack 100 can be compressed straight in the stacking direction even if the point of application of the resultant force does not necessarily have to coincide with the gravity center GC of the cell stack 100 precisely when the pressure plate 200 is pressed by a plurality of pressing members 120. The pressing openings 322 may have a thread groove in their interior surfaces.

The three shaft openings 323 are aligned along the periphery of the rear wall 320 which is connected to the bottom wall 340. Two of the three shaft openings 323 on both sides are formed at locations which face the grooves that are defined by the notches 155, 165 and 185 of the seal-integrated membrane electrode assemblies 150 and the separators 160 and 180 as seen in the x-direction. The center one of the three shaft openings 323 is formed at a location which faces the groove that is defined by the notches 156, 166 and 186 of the seal-integrated membrane electrode assemblies 150 and the separators 160 and 180. As described above, the three shaft openings 323 do not face the cell stack 100 but face the plate member 410, which is attached to the opposite side of the case body 305, through the grooves that are described above. Because the three shaft openings 323 are aligned along the periphery of the rear wall 320 which is connected to the bottom wall 340, the shaft members 430, which extend between the shaft openings 323 and the plate member 410, can receive the reaction force from the cell stack 100, which is held in compression in the stacking direction. This prevents the bottom wall 340, which has the bottom opening 341, from being deformed.

Figure 5:
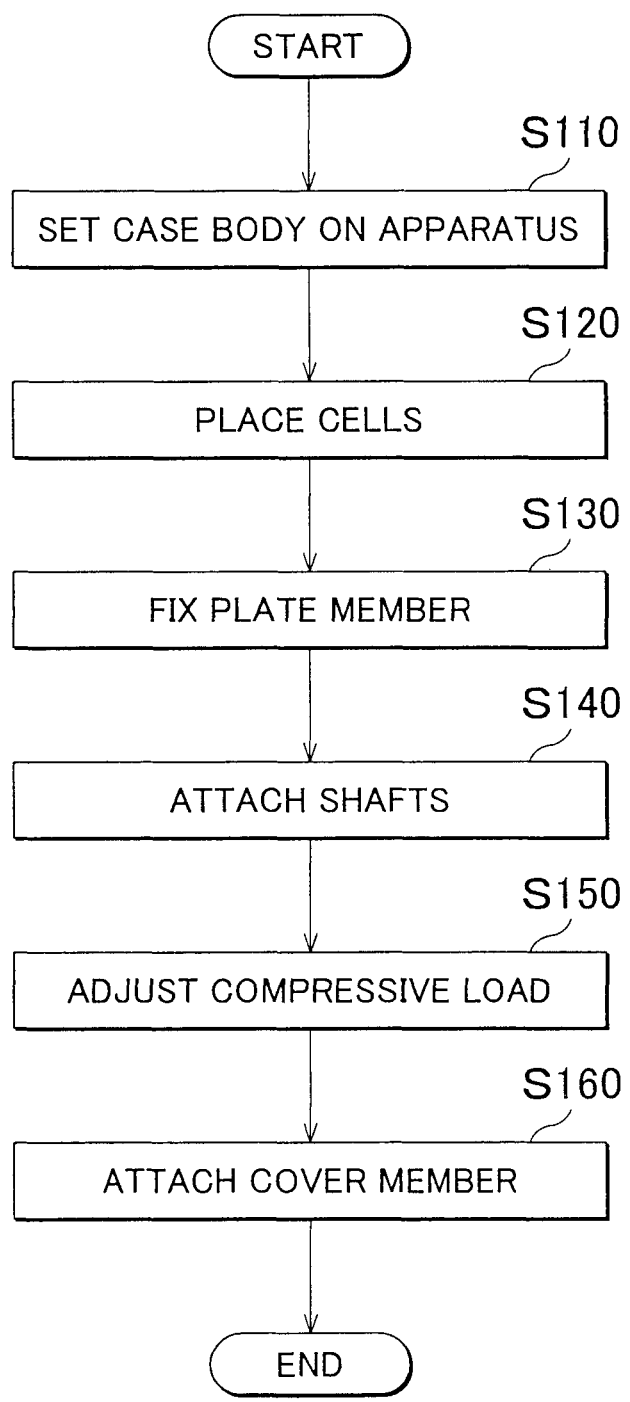
FIG. 5 is an explanatory diagram that is used to explain the procedure of a method for the production of a fuel cell according to the first embodiment.

FIG. 5 is a flowchart that is used to explain the procedure of the method for the production of the fuel cell 10. In producing the fuel cell 10, the case body 305, to which the monitoring circuit 550 (refer to FIG. 2A) has been attached, is set on a production apparatus 600 (refer to FIG. 6) (step S110).

Figure 6:
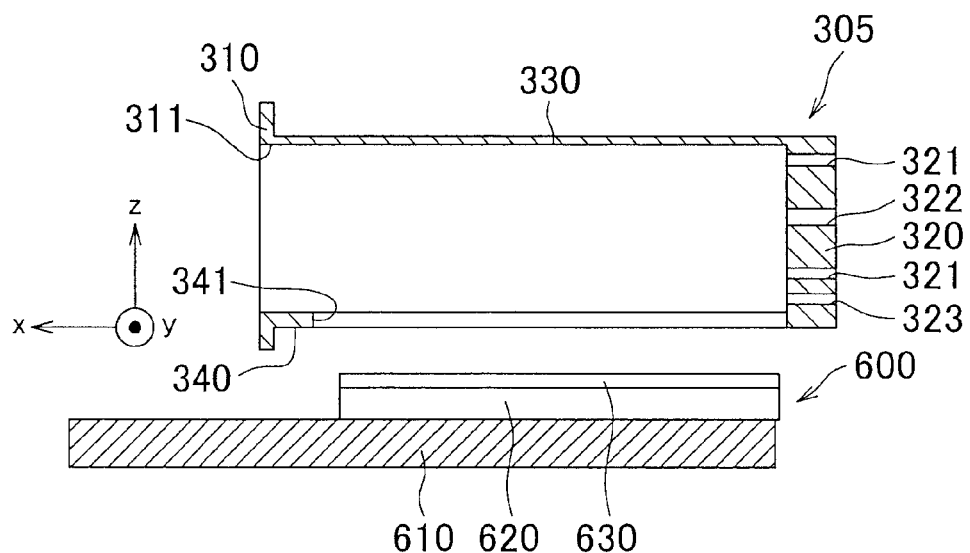
FIG. 6 is an explanatory diagram that illustrates the manner in which the case body is set on a production apparatus according to the first embodiment.

FIG. 6 is an explanatory diagram that is used to explain the manner in which the case body is set on the production apparatus. The production apparatus 600, which is an apparatus that is used to produce a fuel cell, includes a flat plate-like table 610, a stationary guide 620, and a movable guide 630. The stationary guide 620 has an elongated outer configuration and is fixed on the table 610. The movable guide 630 has an elongated outer configuration similar to that of the stationary guide 620, and is movable horizontally with its top surface flush with the top surface of the stationary guide 620. The case body 305 is placed on the table 610 of the production apparatus 600. At this time, the case body 305 is placed such that the stationary guide 620 and the movable guide 630 are located in the case body 305 beyond the bottom opening 341. After the case body 305 is set on the production apparatus 600, the unit cells 105 are placed in the case body 305 (step S120 in FIG. 5).

Figure 7:
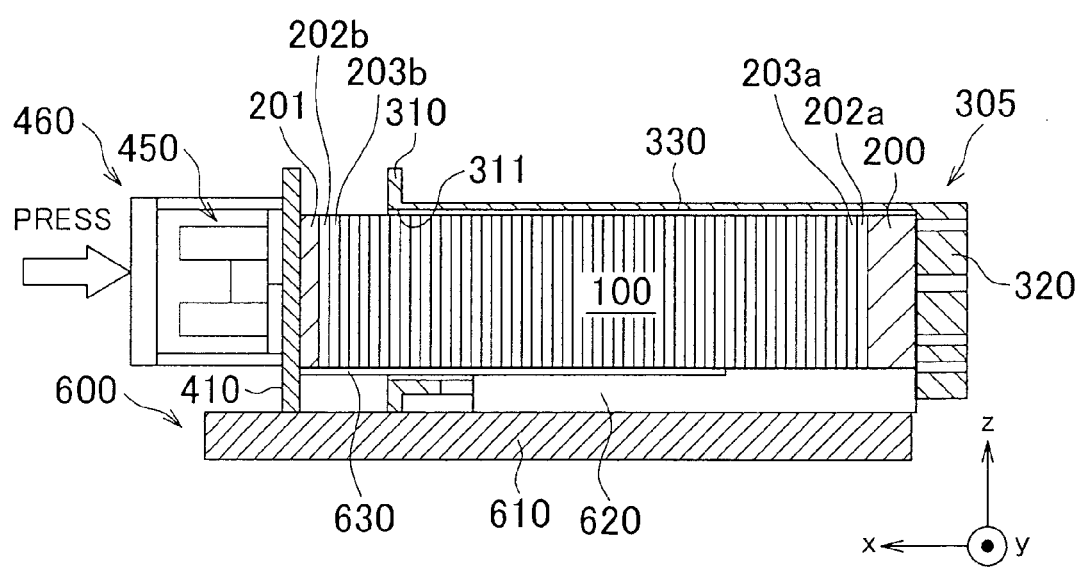
FIG. 7 is an explanatory diagram that illustrates the manner in which the unit cells are housed in a case body according to the first embodiment.

FIG. 7 is an explanatory diagram that illustrates the manner in which the unit cells 105 are placed in the case body 305. First, a portion of the movable guide 630 in the case body 305 is drawn out of the case body 305 through the front opening 311 of the case body 305. The pressure plate 200, the insulator plate 202a, the terminal plate 203a, a plurality of unit cells 105 (the cell stack 100), the terminal plate 203b, the insulator plate 202b, and the stack manifold 201 are placed in this order on the top surface of the movable guide 630, which has been partially drawn out of the case body 305, and on the top surface of the stationary guide 620. After that, a pressurizing mechanism 460 is used to press the plate member 410, to which the auxiliary components 450 have been attached, to compress the cell stack 100 in the stacking direction (x-direction). The cell stack 100 is placed in compression in the stacking direction (x-direction) in the case body 305. At this time, the plate member 410 is pressed and brought into contact with the front wall 310.

Figure 8:
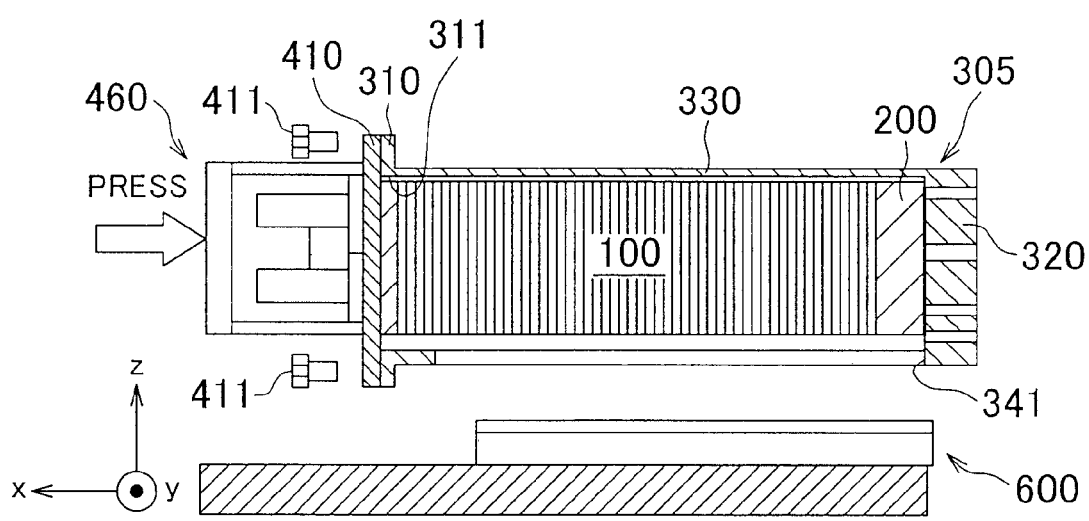
FIG. 8 is an explanatory diagram that illustrates the manner in which a plate member is fixed to a front wall according to the first embodiment.

FIG. 8 is an explanatory diagram that illustrates the manner in which the plate member 410 is fixed to the front wall 310. The plate member 410 is fixed in contact with the front wall 310 by the bolts 411 (step S130 in FIG. 5). As a result, the cell stack 100 is held under a prescribed load in the stacking direction in the case body 305. The fuel cell assembly which has gone through step S130, in which the plate member 410 is attached to the front wall 310, may be hereinafter referred to as "preliminary assembly 11." After step S130, the preliminary assembly 11 is removed from the production apparatus 600. Then, the shaft members 430 are attached to the preliminary assembly 11 (step S140).

Figure 9A:
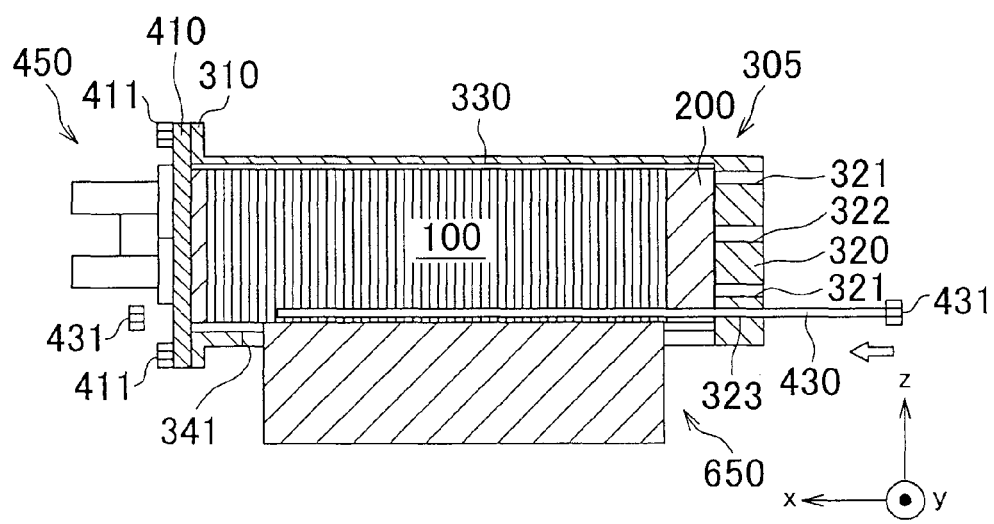
FIG. 9A and FIG. 9B are explanatory diagrams that are used to explain the manner in which shaft members are attached to a preliminary assembly according to the first embodiment.
Figure 9B:
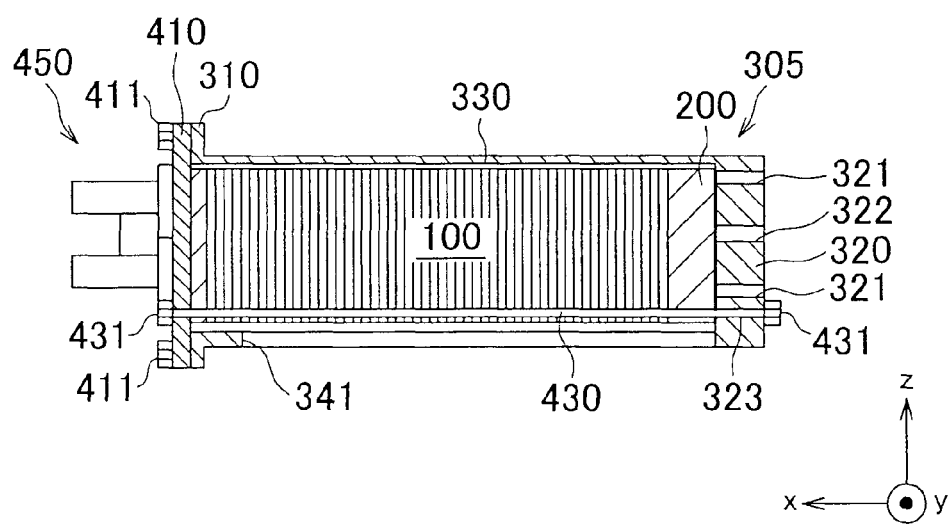

FIG. 9A and FIG. 9B are explanatory diagrams that illustrate the manner in which the shaft members 430 are attached to the preliminary assembly 11. As shown in FIG. 9A, the preliminary assembly 11 is set on an installation device 650. The installation device 650 is a table on which the preliminary assembly 11 is placed and has a plurality of rollers (not shown) in its top surface. The preliminary assembly 11 is placed on the installation device 650 such that the cell stack 100 contacts the top surface of the installation device 650. After that, the shaft members 430 are inserted through the shaft openings 323 of the preliminary assembly 11. After the shaft members 430 are inserted from the rear wall 320 to the plate member 410, the both ends of respective shaft members 430 are fixed to the rear wall 320 and the plate member 410 by nuts 431 as shown in FIG. 9B. After the shaft members 430 are attached to the preliminary assembly 11, the compressive load in the stacking direction (x-direction) on the cell stack 100 is adjusted (step S150).

Figure 10A:
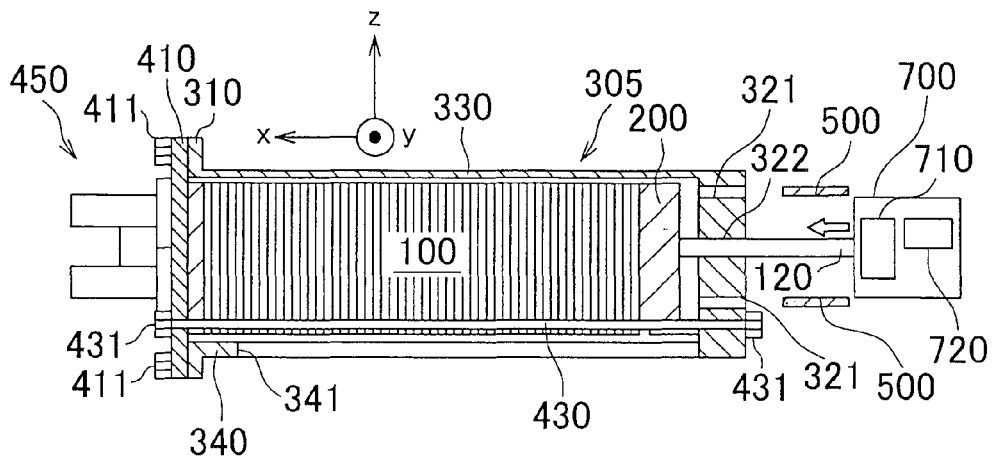
FIG. 10A to FIG. 10C are explanatory diagrams that are used to explain the manner in which the compressive load on the cell stack is adjusted according to the first embodiment.
Figure 10B:
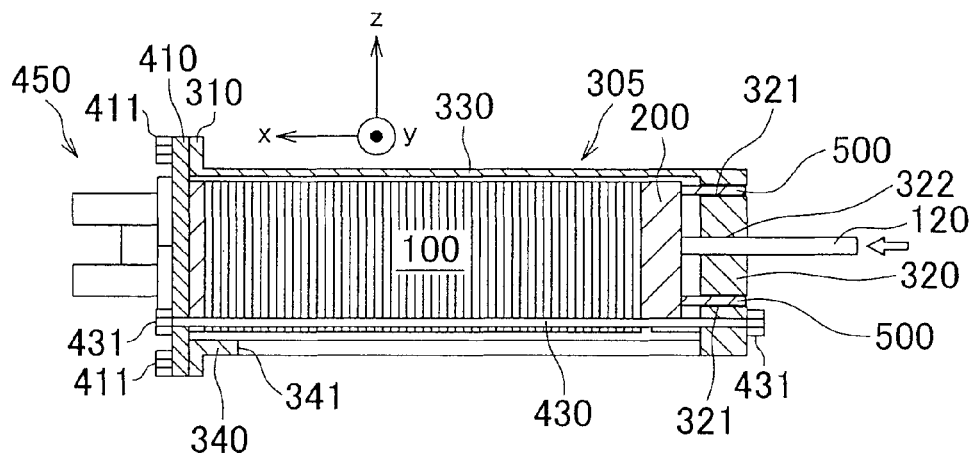
Figure 10C:
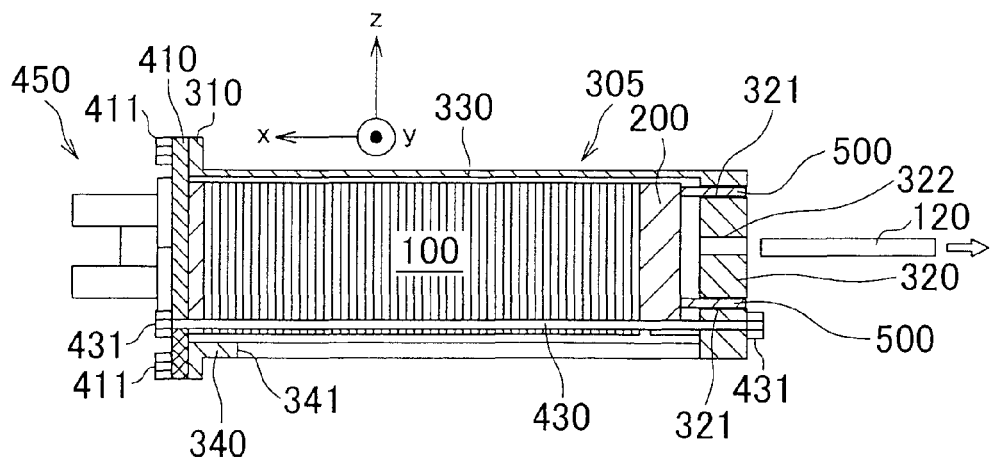

FIG. 10A to FIG. 10C are explanatory diagrams that are used to explain the manner in which the compressive load on the cell stack 100 is adjusted. As shown in FIG. 10A, the rod-like pressing members 120 are inserted through the pressing openings 322 to press the pressure plate 200. The cell stack 100 is compressed in the stacking direction (x-direction) by the pressing force of the pressure plate 200. In other words, the compressive load on the cell stack 100 in the stacking direction can be adjusted by adjusting the pressing force that is applied to the pressure plate 200 by the pressing members 120. In this embodiment, the pressing members 120 are included in a pressurizing unit 700, and can receive power from a driving part 710 of the pressurizing unit 700 to apply a given load to the pressure plate 200. The pressurizing unit 700 includes a load-measuring part 720 which can detect the load that is applied to the pressure plate 200 by the pressing members 120. In other words, the pressurizing unit 700 can detect the compressive load on the cell stack 100 in the stacking direction (x-direction). Thus, the fuel cell itself does not have to have a detecting part that detects the compressive load on the cell stack 100, resulting in a reduction in weight and production cost of the fuel cell.

When the compressive load on the cell stack 100 in the stacking direction (x-direction) reaches a predetermined value, the load-adjusting screws 500 are attached as shown in FIG. 10B with the compressive load maintained. The compressive load may be approximately 36.5 kN, for example. The load-adjusting screws 500 are attached by threading the load-adjusting screws 500 into the eight screw openings 321 of the rear wall 320. The tightening torque at this time may be 1 to 2.5 Nm, for example. The load-adjusting screws 500 are preferably tightened with a tightening torque in the range of 5 Nm±30%, in other words, in the range of 3.5 to 6.5 Nm.

This is because the lower limit of the tightening torque is preferably at least 3 Nm in order to seat the load-adjusting screws 500 tightly against the pressure plate 200. On the other hand, the upper limit of the tightening torque is preferably low enough that the pressure plate 200 is hardly moved by the axial force from the load-adjusting screws 500 that is generated by the tightening torque. When the load-adjusting screws 500 are attached with the compressive load in the stacking direction on the cell stack 100 maintained at 36.5 kN by the pressurizing unit 700, the axial force per one load-adjusting screw 500 in the eight load-adjusting screws 500 is preferably lower than 4.56 ($\approx$36.5/8) kN. In this embodiment, the load-adjusting screws 500 are designed to apply an axial force of 1.6 kN or below when the tightening torque is 6.5 Nm or below to prevent the pressure plate 200 from being moved by the tightening torque.

After the eight load-adjusting screws 500 are attached to the preliminary assembly 11, the pressing members 120 are removed from the preliminary assembly 11 as shown in FIG. 10C. Because the load-adjusting screws 500 prevent the pressure plate 200 from substantially moving after the pressing members 120 are removed, the cell stack 100 is held in place and the compressive load in the stacking direction is maintained at a prescribed value (36.5 kN, for example) by the pressure plate 200 and the plate member 410. After the load-adjusting screws 500 are attached, a torque of 4 Nm 30% may be applied to the load-adjusting screws 500 to check whether the load-adjusting screws 500 are tightly seated before the pressing members 120 are removed. After the removal of the pressing members 120, the cover member 420 is attached to the preliminary assembly 11 (refer to FIG. 11A and FIG. 11B) (step S160).

Figure 11A:
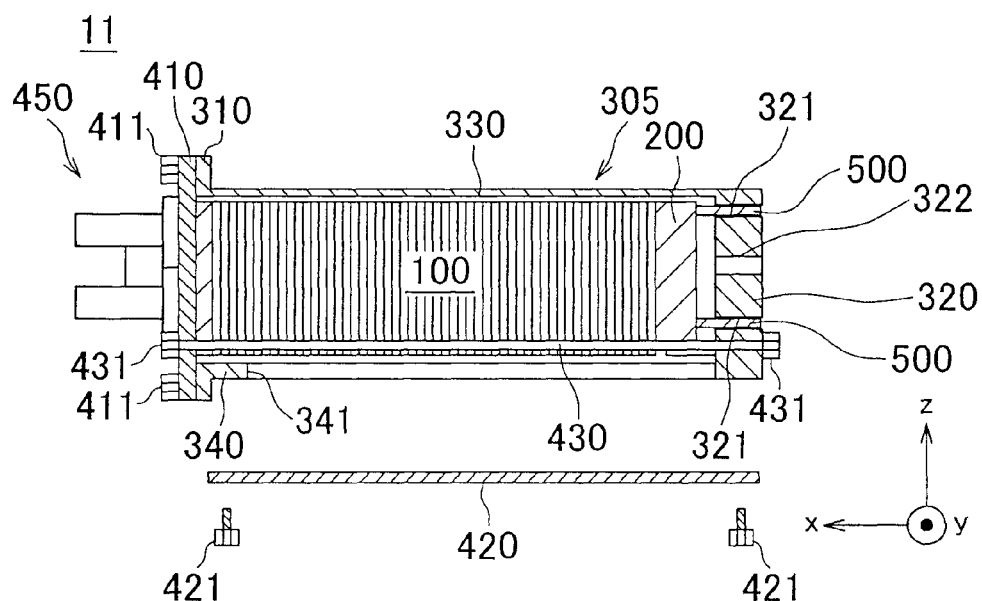
FIG. 11A and FIG. 11B are explanatory diagrams that are used to explain the manner in which a cover member is attached to the preliminary assembly according to the first embodiment.
Figure 11B:
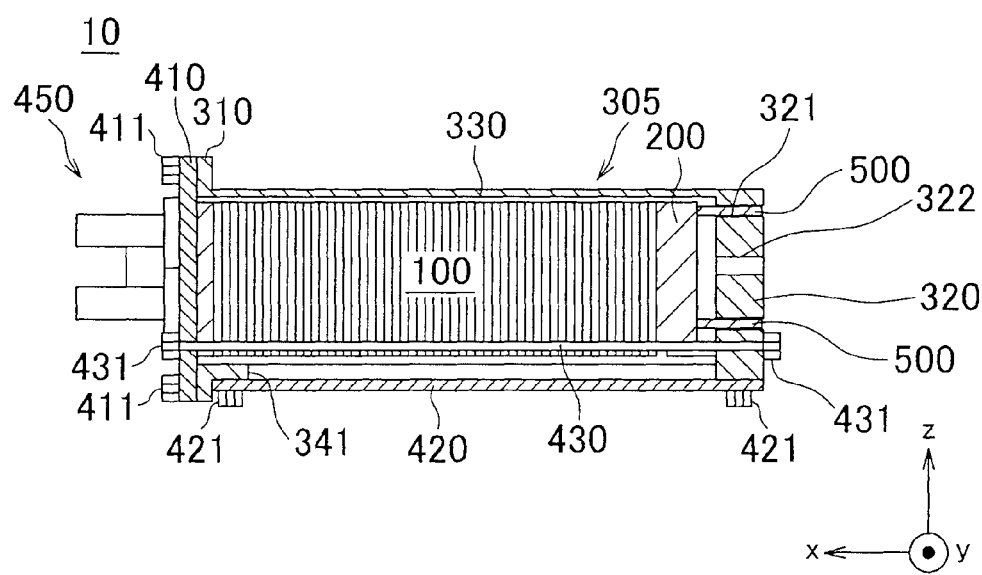

FIG. 11A and FIG. 11B are explanatory diagrams that illustrate the manner in which the cover member 420 is attached to the preliminary assembly 11. As shown in FIG. 11A, the cover member 420 is attached to the bottom wall 340 by bolts 421 to close the bottom opening 341. This completes the production of the fuel cell 10 as shown in FIG. 11B.

The pressing openings 322 of this embodiment correspond to the "first openings" of the present invention. The screw openings 321 and the load-adjusting screws 500 of this embodiment correspond to the "fixing portion" of the present invention. The screw openings 321 of this embodiment correspond to the "female thread portion" or "second openings" of the present invention.

According to the fuel cell 10 of this embodiment that is described in the foregoing, the pressure plate 200 can be pressed in the stacking direction (x-direction) from outside the case body 305 through the pressing openings 322, and the pressure plate 200 can be fixed in place by attaching the load-adjusting screws 500 to the screw opening 321 with the pressure plate 200 pressed in the stacking direction. Thus, the fuel cell 10, in which the cell stack 100 which is held in compression in the stacking direction in the case body 305, can be produced easily.

One generally known method for the production of a fuel cell in which a cell stack which is held in compression in the stacking direction in a case body is to adjust the compressive load on the cell stack by pressing a pressure plate with a screw member from outside the case. In this case, however, chips may be formed from the screw hole because the screw member is threaded against the reaction force from the cell stack that is compressed in the stacking direction (x-direction). When the cell stack is pressed at three or more points, it is difficult to apply the resultant force of the pressing forces at a point close to the gravity center GC of the cell stack 100 because the cell stack cannot be pressed sufficiently at one or more points. In addition, a detecting part that detects the compressive load on the cell stack must be provided in the fuel cell 10 because it is difficult to detect the compressive load from outside the fuel cell 10. This may lead to an increase in production cost and weight. Further, because the screws used are selected during the production process, a releasing step of releasing the compression of the cell stack is required after the cell stack is preliminarily compressed and the dimensions of the cell stack are measured.

In contrast, according to the fuel cell 10 of this embodiment, the formation of chips from the screw openings 321 can be prevented because the load-adjusting screws 500 are attached after the cell stack 100 is compressed with the pressing members 120. In addition, the resultant force of the pressing forces can be applied to a point close to the gravity center GC of the cell stack 100 because the cell stack 100 is pressed at two points by the pressing members 120. Moreover, the compressive load on the cell stack 100 can be detected with an external device, such as the pressurizing unit 700, because the pressure plate 200 is pressed from outside the case body 305 through the pressing openings 322. Further, there is no need for a releasing step because the load-adjusting screws 500 are attached after the cell stack 100 is compressed with the pressing members 120. This leads to a shorter production process.

Another conventionally known method for adjusting the compressive load on the cell stack is to interpose a plurality of flat plate-like shim plates between the case and the cell stack. In this case, however, the weight of the fuel cell increases by the weight of the shim plates, and it is not easy to adjust the compressive load finely by changing the thickness of the shim plates. In contrast, according to the fuel cell 10 of this embodiment, an increase in weight of the fuel cell 10 is prevented because the load-adjusting screws 500 are used to restrict the pressure plate 200 from moving. In addition, the compressive load can be finely adjusted easily because an external pressurizing unit 700 is used to compress the cell stack 100.

Figure 12:
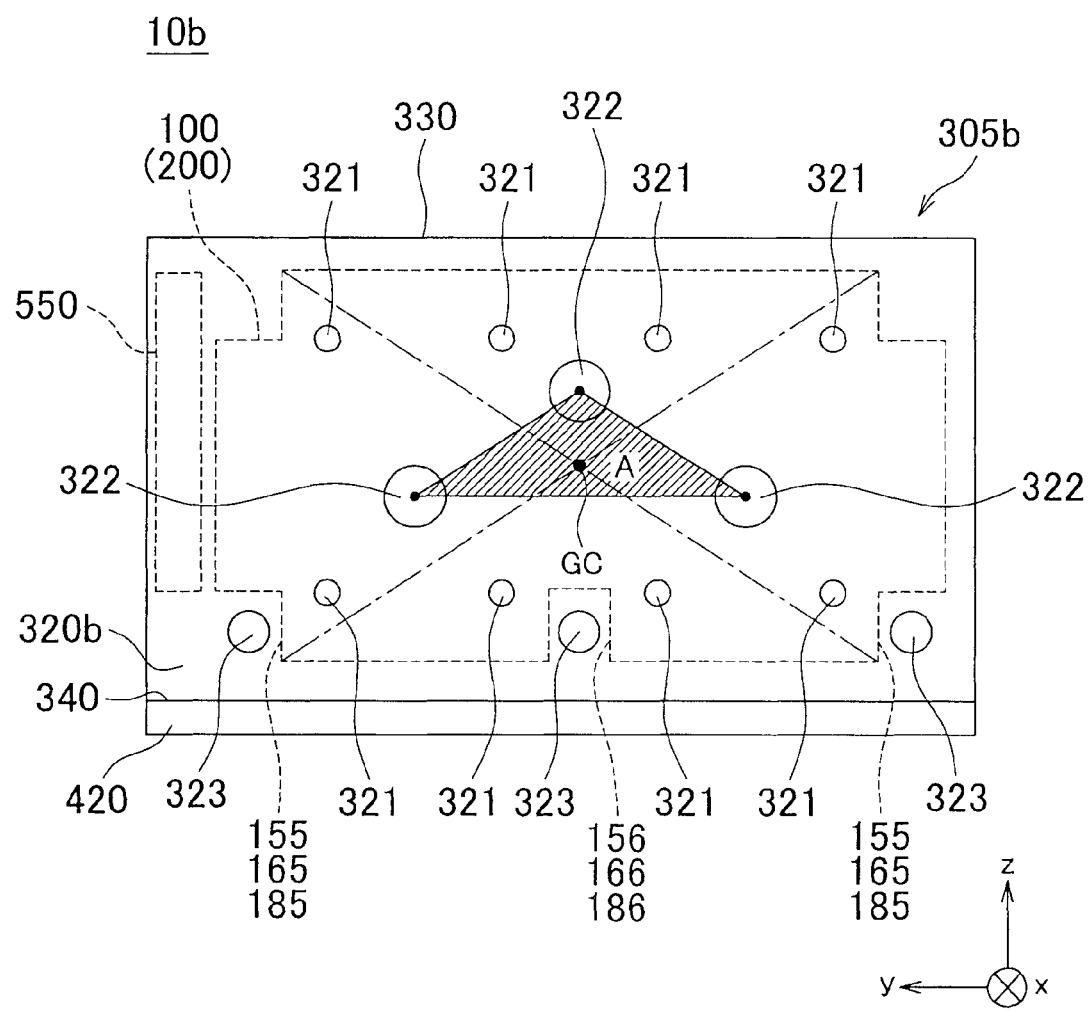
FIG. 12 is an explanatory diagram that is used to explain the positions of pressing openings of a case body of a second embodiment of the present invention.

FIG. 12 is an explanatory diagram that is used to explain the positions of the pressing openings 322 of a case body 305b of a second embodiment of the present invention. FIG. 12 corresponds to FIG. 4 for the first embodiment. The fuel cell 10 of the first embodiment has a case body 305 which has two pressing openings 322, whereas a fuel cell 10b of the second embodiment has a case body 305b which has three pressing openings 322. The fuel cell 10b of the second embodiment is otherwise constructed in the same manner as the fuel cell 10 of the first embodiment, and therefore its description is omitted.

The three pressing openings 322 of a rear wall 320b of the case body 305b are located to surround the gravity center GC of the cell stack 100 as seen in the x-direction. In other words, the three pressing openings 322 are located such that the gravity center GC of the cell stack 100 is in a region A that is surrounded by the three pressing openings 322 as seen in the x-direction. This enables the resultant force of the pressing forces that are applied to the pressure plate 200 to act at a point close to the gravity center GC of the cell stack 100 when the pressure plate 200 is pressed by the pressing members 120 through the pressing openings 322.

In this embodiment, the pressing openings 322 have a circular configuration which allows insertion of the circular columnar pressing members 120 therethrough. Thus, the region A is defined as a region that is surrounded by the lines which connect the centers of the pressing openings 322. The gravity center of the region A is coincident with the gravity center GC of the cell stack 100 as seen in the x-direction. This configuration enables the resultant force of the pressing forces that are applied to the pressure plate 200 to act at a point closer to the gravity center GC of the cell stack 100. The region A may be defined as the smallest region among the regions that are formed by connecting the edges of the three pressing openings 322.

According to the fuel cell 10b of this embodiment that is described above, the fuel cell 10b can be produced easily even when the case body 305b has three pressing openings 322 because the cell stack 100 can be compressed straight in the stacking direction (x-direction) with three pressing members 120. When the cell stack 100 is compressed with four pressing members 120, a situation may arise in which three of the pressing members 120 press the pressure plate 200 but the other pressing member 120 cannot press the pressure plate 200 sufficiently, and the point at which the resultant force of the pressing forces that are applied to the pressure plate 200 is applied may be displaced from the gravity center GC of the cell stack 100 as seen in the x-direction. Therefore, when a plurality of pressing members 120 are used to press the pressure plate 200, the number of the pressing members 120 is preferably three or less.

Figure 13:
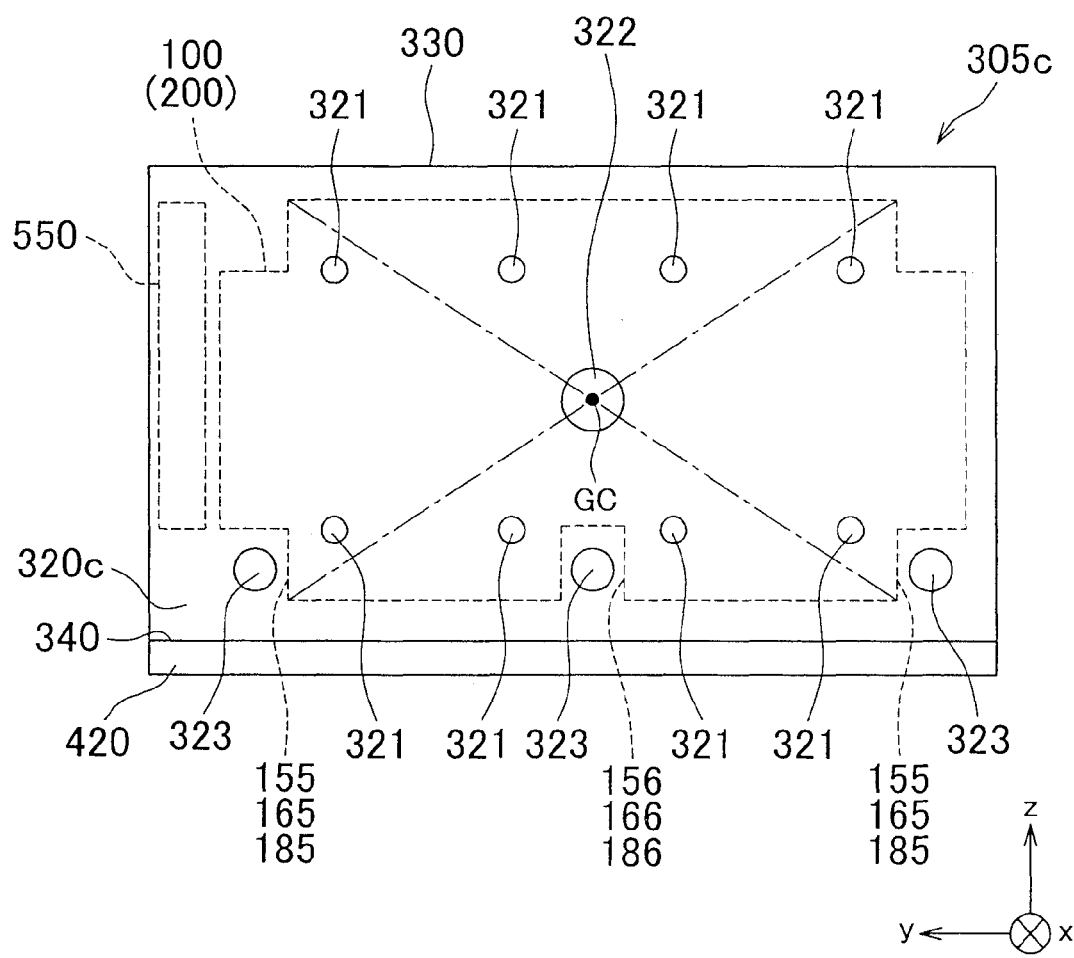
FIG. 13 is an explanatory diagram that is used to explain the positions of pressing openings of a case body of a third embodiment of the present invention.

FIG. 13 is an explanatory diagram that is used to explain the position of the pressing opening 322 of a case body 305c in a third embodiment of the present invention. FIG. 13 corresponds to FIG. 4 for the first embodiment. A fuel cell 10c of the third embodiment has a case body 305c which has only one pressing opening 322. The fuel cell 10c of the third embodiment is otherwise constructed in the same manner as the fuel cell 10 of the first embodiment, and therefore its description is omitted.

The one pressing opening 322 of a rear wall 320c of the case body 305c faces the gravity center GC of the cell stack 100 as seen in the x-direction. In other words, the pressing opening 322 is located such that the gravity center GC of the cell stack 100 is located in the opening as seen in the x-direction. This enables the pressing force that is applied by the pressure plate 200 to act at a point close to the gravity center GC of the cell stack 100 when the pressure plate 200 is pressed by a pressing member 120 through the pressing opening 322.

According to the fuel cell 10c of this embodiment that is described above, the fuel cell 10c can be produced easily even when the case body 305c has only one pressing opening 322 because the cell stack 100 can be compressed straight in the stacking direction (x-direction) with a pressing member 120.

It is appreciated that this invention is not limited to the above embodiments and may be embodied in various ways without departing from the gist thereof. For example, the following modifications may be made.

Figure 14:
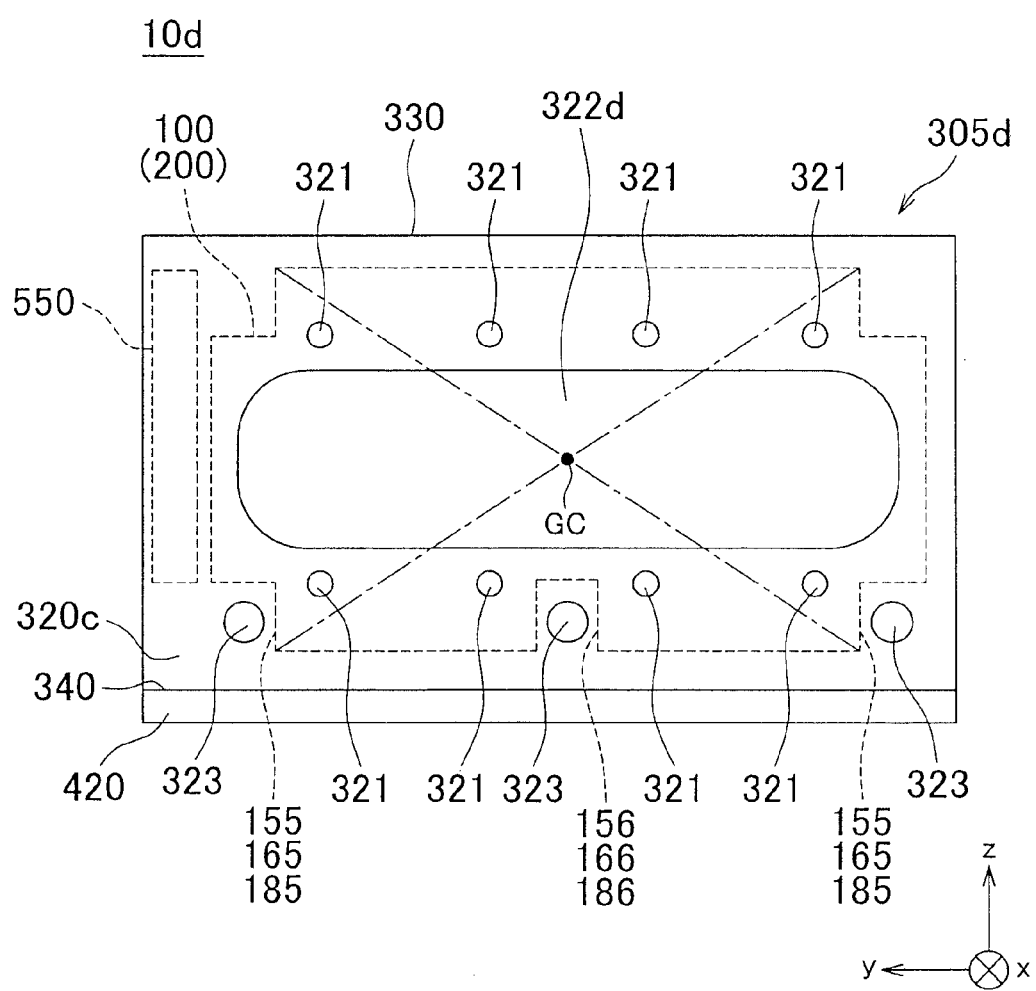
FIG. 14 is an explanatory diagram that is used to explain the position of a pressing opening of a case body of a first modification of the above embodiments of the present invention.

FIG. 14 is an explanatory diagram that is used to explain the position of the pressing opening 322 of a case body 305d of a first modification of the present invention. While the pressing openings 322 are described as having a circular configuration in the first to third embodiments, the pressing openings 322 may have any shape other than circular as long as they are large enough to allow insertion of the pressing members 120. For example, a fuel cell 10d may have a pressing opening 322d which is large enough to allow insertion of a plurality of pressing members 120 as shown in FIG. 14. On the other hand, the pressing openings 322 may be smaller in size than the screw openings 321 as long as they are large enough to allow insertion of the pressing members 120.

Figure 15A:
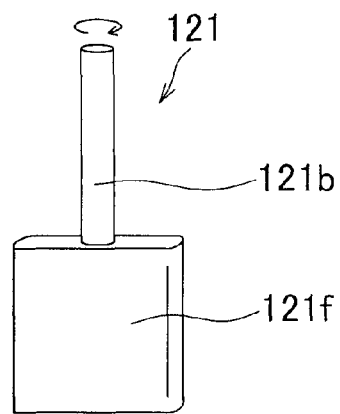
FIG. 15A to FIG. 15C are explanatory diagrams that are used to explain the position of a pressing opening of a case body of a second modification of the above embodiments of the present invention.
Figure 15B:
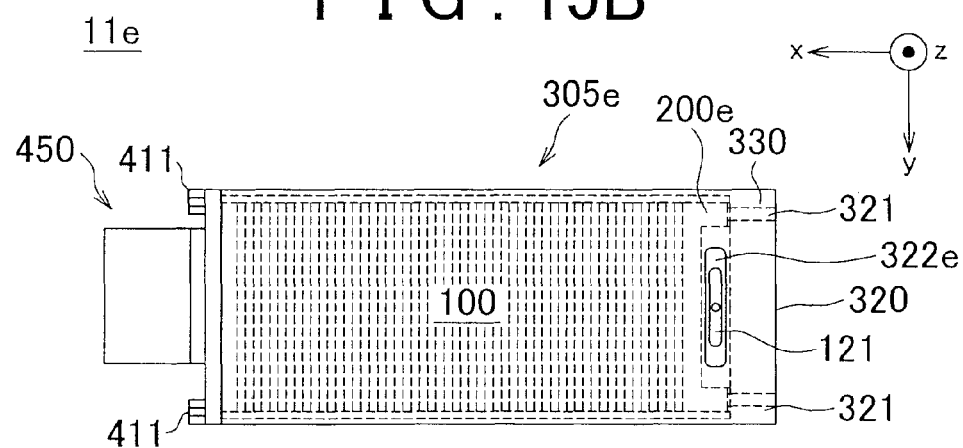
Figure 15C:
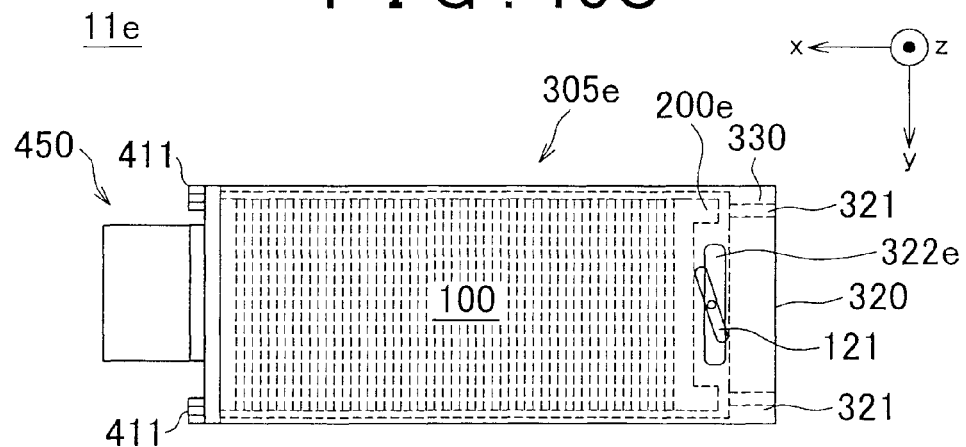

FIG. 15A to FIG. 15C are explanatory diagrams that are used to explain the position of a pressing opening 322e of a case body 305e of a second modification. While the pressing openings 322 are described as being formed through the rear wall 320 of the case body 305 in the first to third embodiments, the pressing openings 322 may be formed through a member other than the rear wall 320 of the case body 305 as long as the pressure plate 200 can be pressed in the stacking direction (x-direction) from outside the case body 305 with a pressing member or members 120.

One example is shown with reference to FIG. 15A to FIG. 15C. First, a pressing member 121 that includes a flat portion 121f and a rod portion 121b as shown in FIG. 15A is prepared. The rod portion 121b has one end that is connected to an end face of the flat portion 121f and another end that is connected to a rotary drive source (not shown). As shown in FIG. 15B, a preliminary assembly 11e of a fuel cell according to a second modification has a case body 305e that includes a top wall 330 which has an elongated opening as a pressing opening 322e. The pressing member 121 is inserted through the pressing opening 322e such that the flat portion 121f is located in the case body 305e. Then, the pressing member 121 is rotated about the rod portion 121b as shown in FIG. 15C. This enables the flat portion 121f to press a pressure plate 200e to compress the cell stack 100 in the stacking direction.

Figure 16A:
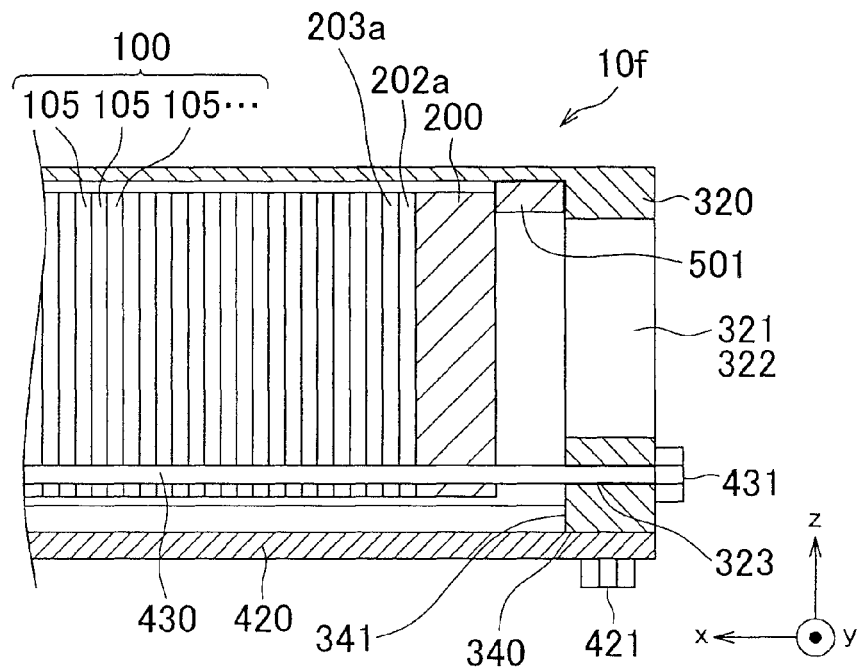
FIG. 16A and FIG. 16B are explanatory diagrams that are used to explain a fixing portion of a fuel cell of a third modification of the above embodiments of the present invention.
Figure 16B:
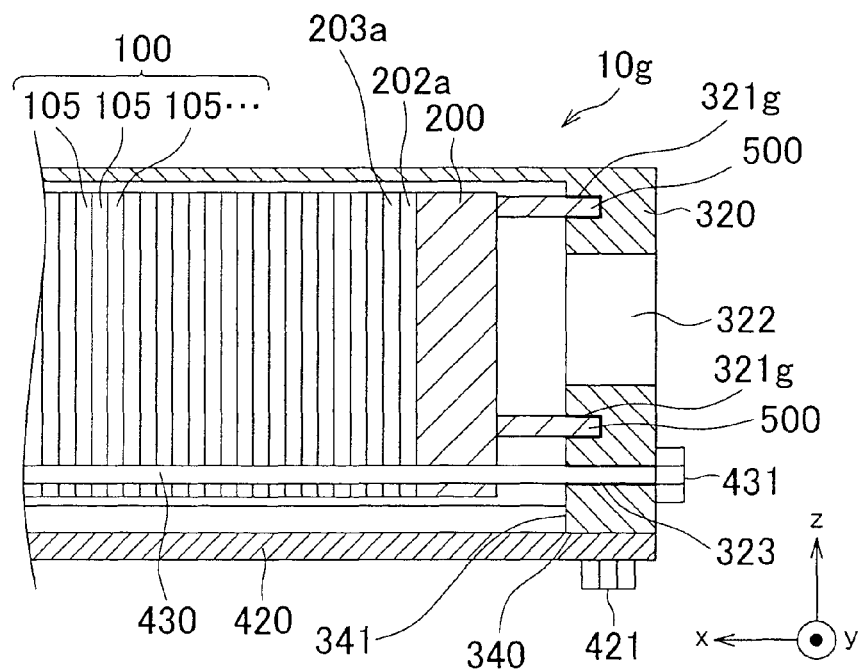

FIG. 16A and FIG. 16B are explanatory diagrams that are used to explain a fixing portion of a fuel cell of a third modification. While the screw openings 321 and the load-adjusting screws 500 are used as fixing portions that restrict the pressure plate 200, which is pressed in a direction from the cell stack 100 toward the rear wall 320 (x-direction), from moving in the above embodiments, any means other than the screw openings 321 and the load-adjusting screws 500 may be used as long as the pressure plate 200 can be restricted from moving. For example, a rod member 501 may be interposed between the pressure plate 200 and the rear wall 320 as the fixing portion as shown in FIG. 16A.

Alternatively, as shown in FIG. 16B, blind female screw holes 321g may be formed, instead of the screw openings 321, which are through-holes, in the rear wall 320 at positions opposed to the pressure plate 200 to receive the load-adjusting screws 500. Alternatively, openings may be formed, instead of the screw openings 321, through the top wall 330 or the bottom wall 340, or the right side wall 350 or the left side wall 360, so that the pressure plate 200 may be fixed in place by fixing the pressing member 121, which is shown in FIG. 15A to FIG. 15C, after rotating it, for example. The pressure plate 200 may be fixed in place by bonding the pressure plate 200 to the case body 305 with an adhesive after the cell stack 100 is compressed. In this case, the adhesive functions as the fixing portion.

While the screw openings 321 and the pressing openings 322 are described as being formed through the rear wall 320 of the fuel cell 10 in the above embodiments, the screw openings 321 and the pressing openings 322 may be formed through the plate member 410, which is disposed on the front of the fuel cell 10. Even in this case, the cell stack 100 can be compressed in the stacking direction from outside the case body 305 through the pressing openings 322, and the load-adjusting screws 500 can be inserted through the screw openings 321 with the cell stack 100 compressed by the pressing members 120.

While the fuel cell 10 is described as having the pressure plate 200 in addition to the cell stack 100 in the above embodiments, a member which forms a part of the cell stack 100 and which can receive stress from the pressing members 120 at an end of the cell stack 100 in the stacking direction, such as a separator, may be also used as a pressure plate.

While the case body 305 is described as having one to three pressing openings 322 in the above embodiments, the fuel cell 10 may have four or more pressing openings 322 because the pressing members 120 can be inserted through any one to three of the pressing openings 322 to compress the cell stack 100 even when the case body 305 has four or more pressing openings 322.

While the portions of the case body 305 are referred to as "front wall 310," "rear wall 320," "top wall 330," "bottom wall 340," "right side wall 350," and "left side wall 360" in the above embodiments, these names are for description purposes only and are unrelated to the orientation in which the fuel cell 10 is installed. In addition, the case body 305 may have such a shape that the boundaries between the front wall 310, the rear wall 320, the top wall 330, the bottom wall 340, the right side wall 350, and the left side wall 360 cannot be clearly defined, and the boundaries may be defined arbitrarily.

While the rear wall 320 of the case body 305 is described as having three types of openings, i.e., the screw openings 321, the pressing openings 322, and the shaft openings 323, in the above embodiments, the rear wall 320 may have four or more types of openings. The case body 305 may not have the shaft openings 323.

While a solid polymer fuel cell is used as the fuel cell in this embodiment, various types of fuel cells, such as phosphoric acid fuel cells, molten carbonate fuel cells, and solid oxide fuel cells, may be used.

The invention claimed is:

1. A fuel cell comprising:
a cell stack in which a plurality of unit cells are stacked,
a case that houses the cell stack, and
a pressure plate that is placed in the case at a position between an end of the cell stack in the stacking direction and the case,
wherein the case has a first opening for inserting and removing a pressing member that presses the pressure plate in the stacking direction from outside the case, and a fixing portion that fixes the pressure plate in place with the cell stack compressed to an extent of a predetermined compressive load in the stacking direction,
wherein the fixing portion includes a female thread portion that is provided in the case to face the pressure plate in the stacking direction, and a screw member that has a proximal end which is connected to the female thread portion and a distal end which is in contact with the pressure plate, and
wherein the pressing member is removed from the first opening while the predetermined compressive load on the cell stack is maintained.

2. The fuel cell according to claim 1, wherein the first opening faces the pressure plate in the stacking direction.

3. A fuel cell comprising:
a cell stack in which a plurality of unit cells are stacked,
a case that houses the cell stack, and
a pressure plate that is placed in the case at a position between an end of the cell stack in the stacking direction and the case,
wherein the case has at least one first opening which a pressing member for pressing the pressure plate in the stacking direction from outside the case is inserted, and through which the pressing member is removed; and at least one second opening used to fix the pressure plate in place with the cell stack compressed to an extent of a predetermined compressive load in the stacking direction, and
wherein the pressing member is removed from the first opening while the predetermined compressive load on the cell stack is maintained.

4. The fuel cell according to claim 3, wherein the number of the first opening, which has a larger opening area than the second opening, is one to three.

5. The fuel cell according to claim 4, wherein the number of the first opening is two or three, and the first openings are positioned such that the gravity center of the cell stack is located between the two first openings or in a region that is surrounded by the three first openings as seen from the stacking direction.

6. The fuel cell according to claim 4, wherein the number of the first opening is one, and the first opening is located at a position that is opposed to the gravity center of the cell stack as seen in the stacking direction.

7. The fuel cell according to claim 4, wherein the first opening is used to bring a pressing member that is used to press the pressure plate in the stacking direction from outside the case into contact with the pressure plate.

8. The fuel cell according to claim 3, wherein the second opening which has a smaller opening area than the first opening, has a thread groove in an inner periphery of the second opening.

* * * * *